Patented Feb. 14, 1933

1,897,251

UNITED STATES PATENT OFFICE

CHARLES N. FREY, OF NEW YORK, N. Y., ASSIGNOR, BY MESNE ASSIGNMENTS, TO STANDARD BRANDS INCORPORATED, OF DOVER, DELAWARE, A CORPORATION OF DELAWARE

FOOD PRODUCT

No Drawing. Application filed March 5, 1926. Serial No. 92,618.

This invention relates to food products and to methods of making the same and more particularly to those types of food products known as cakes, and has as a general object the preparation of cakes of improved quality in a convenient and economical manner.

A more specific object is to provide a method of making cake in a manner such that the resultant product will have improved color, texture and flavor.

Other objects of the invention will in part be obvious and will in part appear hereinafter.

The invention accordingly comprises the several steps and the relation of one or more of such steps with respect to each of the others, and the product possessing the features, properties, and the relation of constituents, which are exemplified in the following detailed disclosure, and the scope of the application of which will be indicated in the claims.

Heretofore in the baking industries it has been considered that in order to obtain the best results only the so-called strong flours, or blends containing a large proportion of strong flour, should be used in bread-making whereas in cake-making a weak flour or weak blend is essential. This practice in the art has largely been due to the fact that in bread-making, wherein a relatively long-time fermentation usually occurs, the flour must be of such a strength as to attain its desired condition at approximately the end of the fermentation period or dough time, whereas in cake-baking with the use of chemical leavening agents there is no corresponding dough time and the flour must become properly conditioned within the relatively short period prior to the baking operation.

Although the reasons therefor are still somewhat controversial it is nevertheless known that the aging of flour improves its quality for both bread-making and cake-making and it is also quite generally believed that flour may be artificially aged and correspondingly improved by treating the same with certain agents which have a more or less bleaching action, such as, for example, nitrogen peroxide or chlorine. The chemical action of these two agents are largely dissimilar, however, and the treatment of flour therewith has been carried on with a view merely to obtain the desired whiteness of color and the proper strength for bread-making.

According to the present invention, it has been discovered that if the flour is treated by chlorine to a special extent, not only is the flour markedly improved in color, but also that it is conditioned to a degree such that even flours which were originally too strong for such use can advantageously be used as cake flours. The amount of such chlorine treatment is preferably limited in accordance with the resultant hydrogen-ion concentration which it is desired to attain. The hydrogen-ion concentration of original flours may vary from 5.9 pH to 6.4 pH or over and in the previous commercial chlorine aging processes the acidity was somewhat increased to about 5.7 pH. For the present purpose, however, it has been found to be desirable to continue the chlorine treatment until the hydrogen-ion concentration of the flour is between 5.1 and 5.6 pH and preferably about 5.2 or 5.3 pH. This acidity can readily be accomplished by treating a flour with from 2 to 4 times the amount of chlorine which would have heretofore been used commercially for artificially aging that particular flour and the amounts necessary may be roughly stated as from ¼ to ¾ of an ounce of gaseous chlorine per 100 pounds of flour, the treatment being carried on otherwise in the usual manner. While, in a sense, the improved chlorine treatment of the flour as stated is an extension in degree of that heretofore practiced commercially, it is to be noted that the improvement is for a new purpose and renders possible a new result not comparable to nor predictable from prior practice. In other words, considered commercially, the new hydrogen-ion concentration of the flour is but a fractional change from certain examples of the prior art; but, considered from the practical methods of the cake making industry, this change yields a new and important result opening a new field of use.

It is found that the improved flour which results from this treatment may be used in any cake formula with largely improved results, but if the acidity of the other ingredients entering into the batter is also controlled, still better results may be obtained. The acidity or alkalinity of certain of the ingredients other than flour, (which will hereinafter be referred to as auxiliary ingredients), may vary widely, and it should be the aim to so control the acidity thereof that when mixed with the improved flour and baked, the resultant product will have a neutral or preferably slightly acid reaction, as for example, about 7.0 or 6.8 pH. Sufficient control of the acidity of the auxiliary ingredients can be had by adjusting the acidity of the milk, egg yolks, and egg whites. This adjustment may be accomplished by adding thereto phosphoric acid if the ingredients are too alkaline and soda or basic sodium phosphate if they are too acid, although, of course, any equivalent non-toxic substances of the desired reaction may be used in place of those suggested. It will be understood that when carrying out manufacture, as described above, a baking powder having an approximately neutral residue should preferably be used, or its acidity or alkalinity should be compensated for along with that of the other auxiliary ingredients in the manner above pointed out.

By the use of the improved cake flour and the control of the ingredients as herein set forth a resultant cake of substantially improved color, flavor, texture and keeping qualities may be obtained.

Since certain changes in carrying out the above process, and certain modifications in the composition which embody the invention may be made without departing from its scope, it is intended that all matter contained in the above description shall be interpreted as illustrative and not in a limiting sense.

Having described my invention, what I claim as new and desire to secure by Letters Patent is:

1. In a method of making cake, the steps which comprise using a flour which has been chlorinated to a hydrogen-ion concentration of approximately 5.3 pH, adjusting the reaction of auxiliary ingredients so that the resultant baked product will have an approximately neutral reaction.

2. A method of making cake which comprises chlorinating the flour to a hydrogen-ion concentration of approximately 5.3 pH, adjusting the acidity of auxiliary ingredients so that the resultant baked product will have an approximately neutral reaction, mixing all the ingredients into a batter and baking the batter.

3. A method of making cake which comprises chlorinating the flour to a hydrogen-ion concentration of between 5.1 and 5.6 pH, adjusting the acidity of auxiliary ingredients so that the resultant baked product will have an approximately neutral reaction, mixing all the ingredients into a batter and baking the batter.

In testimony whereof I affix my signature.

CHARLES N. FREY.